(12) United States Patent
Sellem

(10) Patent No.: US 9,336,339 B2
(45) Date of Patent: *May 10, 2016

(54) COMPUTER AIDED DESIGN METHOD AND SYSTEM FOR MODULAR LAYOUTS

(71) Applicant: Squareclock, Asnieres sur Seine (FR)

(72) Inventor: Eric Sellem, Montreuil (FR)

(73) Assignee: 3DVIA, Vélizy-Villacoublay (FR)

( * ) Notice: Subject to any disclaimer, the term of this patent is extended or adjusted under 35 U.S.C. 154(b) by 72 days.

This patent is subject to a terminal disclaimer.

(21) Appl. No.: 14/027,963

(22) Filed: Sep. 16, 2013

(65) Prior Publication Data

US 2014/0149083 A1 May 29, 2014

Related U.S. Application Data

(63) Continuation of application No. 12/748,988, filed on Mar. 29, 2010, now Pat. No. 8,537,156.

(30) Foreign Application Priority Data

Mar. 27, 2009 (FR) ..................................... 09 01506

(51) Int. Cl.
*G06T 17/00* (2006.01)
*G06F 17/50* (2006.01)
*G06Q 30/06* (2012.01)

(52) U.S. Cl.
CPC ........ *G06F 17/5004* (2013.01); *G06Q 30/0601* (2013.01); *G06F 2217/02* (2013.01)

(58) Field of Classification Search
None
See application file for complete search history.

(56) References Cited

U.S. PATENT DOCUMENTS

| 7,139,685 | B2* | 11/2006 | Bascle et al. ...................... 703/1 |
| 7,277,572 | B2* | 10/2007 | MacInnes et al. ............ 382/154 |
| 7,484,183 | B2 | 1/2009 | Look et al. ..................... 715/839 |
| 8,122,370 | B2 | 2/2012 | Hoguet ......................... 715/779 |
| 2002/0010655 | A1 | 1/2002 | Kjallstrom ...................... 705/27 |
| 2005/0081161 | A1 | 4/2005 | MacInnes et al. ............ 715/765 |
| 2007/0171223 | A1 | 7/2007 | McArdle et al. .............. 345/420 |
| 2007/0233434 | A1 | 10/2007 | Lee ................................. 703/1 |

FOREIGN PATENT DOCUMENTS

| EP | 1 416 404 A2 | 5/2004 |
| JP | 04 163574 | 6/1992 |

* cited by examiner

*Primary Examiner* — Kee M Tung
*Assistant Examiner* — Frank Chen
(74) *Attorney, Agent, or Firm* — Stroock & Stroock & Lavan LLP

(57) ABSTRACT

The invention relates to the design of layouts for a room in which a user wishes to position elements figuring in a collection of catalogs. Prior art systems only allow incremental construction by making direct selections from one or more catalogs. The inventive system and procedure allow rapid, overall construction of several solutions satisfying a certain number of constraints determined by the room, the user or the distributor of the equipment to be positioned, as well as rules derived from experience in the field of the equipment concerned. The method is subdivided into the steps of spatial analysis, definition of layout templates, selection of candidates from the collection of catalogs and optimization of the positioning. The system permits simultaneous visualization in three dimensions of optimum solutions and the printing of two-dimensional assembly drawings. The procedure and the system are preferably applicable to kitchen layouts.

11 Claims, 11 Drawing Sheets

```
<KitchenPlanning ID ="KitchenPlanning_L_Open.1"
 compatibleShapes="2"> compatible shapes : l,L,U,Il
<Parts>
 <Part>
  type="Floor" Lower part (floor), upper part (wall)
  zone="1, 2"  Part of wall to use: e.g. if a U-shaped installation, there are 3 wall sections, here
                only wall sections 1 and 2 will be used
  start="0" end="0"
  template="PlanningTemplate_ODSC_Island_1"> Filling template (see FIG.5)
  <Constraints>                              Constraints
   <VisibleZone zone="2" visible="0"/>       Wall section 2 must not be visible
   <MinLength zone="1" length="4600"/>       The minimum length of the wall section 1 must be 4600
   <MinLength zone="2" length="3300"/>
   <MaxLength zone="2" length="2500"/>       maximum length of the shelving of the wall section 2 must be 2500
   <MaxPosition zone="2" position="3600"/>   Relative position of linear position 2 relative to linear position 1
  </Constraints>
  <PartOption>
   <ZoneOptions  zone="2"                    Options
                 withBackPanel="1"           Rear panel
                 startWithDoubleSide="0" endWithDoubleSide="1"   Double side
                 startWithPanel="0" endWithPanel="0"             Legging
                 backOffset="300" startOffset="0.0"  endOffset="0.0"/>  Overhang of the work surface at the
                                                                         side way and rear way
  </ZoneOptions>
  </PartOptions>
 </Part>
 </Part
  type="Wall"  upper part (wall)
  zone="1"
  start="0" end"0"
  template="PlanningTemplate_WallEmpty_Lift_Glass"/>
</Parts>
</KitchenPlannings>
```

FIG.4

```
<PlanningTemplate ID="PlanningTemplate ODSC Island 1" roomType="Kitchen">
 <TemplateElementGroup ID="FloorGroup" >
  <LayoutModularStorage/>
  <TemplateElement catalogQuery="DefaultFridgeTallUnit" snap="SnapToStart"/>
  <TemplateElement catalogQuery="DefaultHotTallUnit" snap="SnapToPrevious"/>
  <TemplateElement catalogQuery="DefaultDishWasherUnit"/>
  <TemplateElementRef ID="BaseUnitSinkGroup"/>
  <TemplateElementRef ID="BaseUnitCookopIslandDecoHoodGroup" zone="2"/>
 </TemplateElementGroup>
</PlanningTemplate>
```

FIG.5

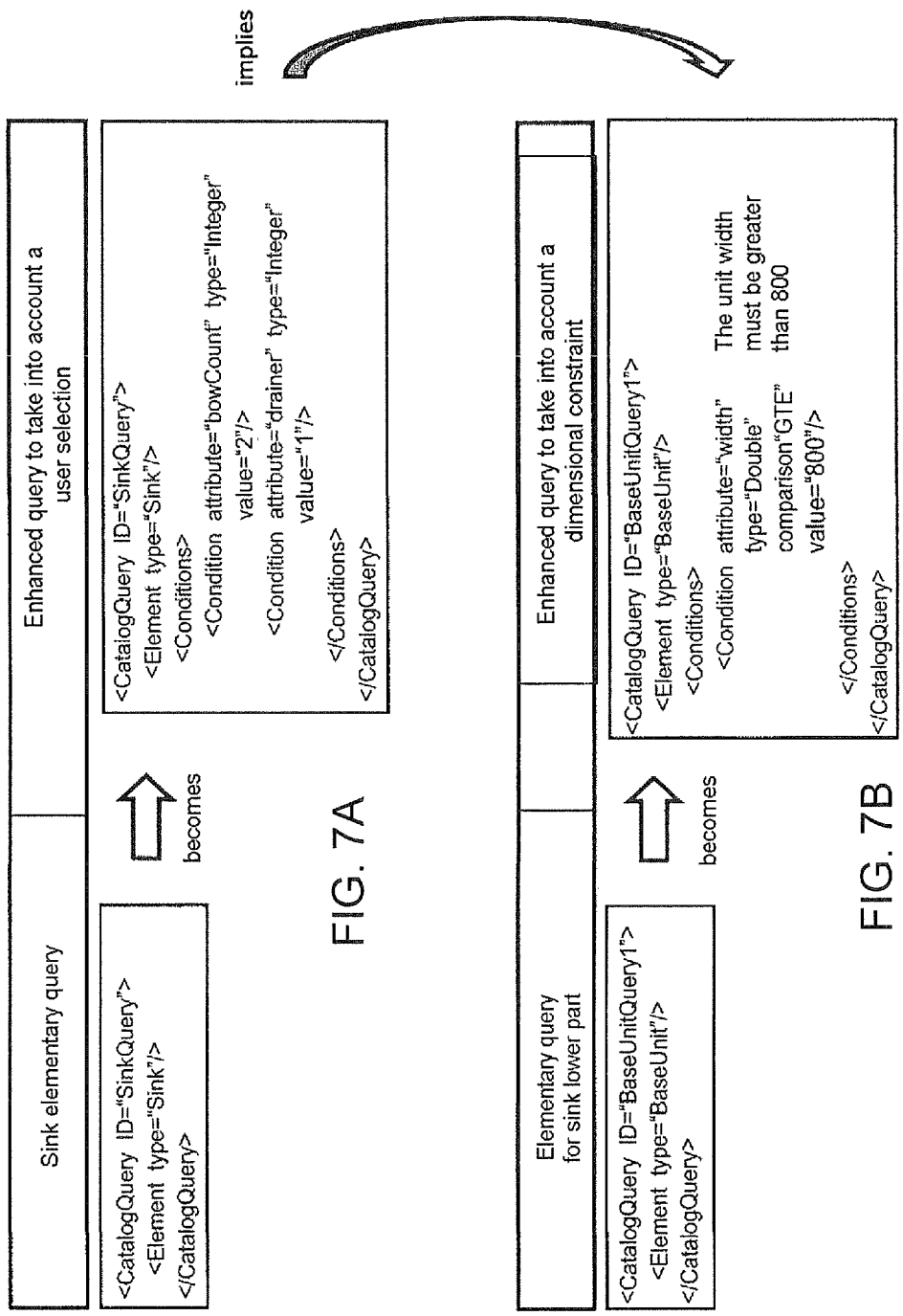

```
<CatalogQuery ID="DefaultWallUnitLiftGlass">
<Element type="WallUnit">
    <Conditions>
        <Condition attribute="hasGlassFront" type="Integer" value="1"/>
        <Condition attribute="isLift" type="Integer" value="1"/>
    </Conditions>
    <Filters>
        < Filter attribute="height" type="Double" criteria="smallest"/>
    </Filters>
</Element>
</CatalogQuery>
```

Type: type of element (here, wall unit)
Conditions
Conditions with which the element must comply

Filters:
The query returns a list of elements which fulfill all the conditions. If a filter is used, the query returns the elements of the list which fulfill the criterion (here, those which have the lowest height)

FIG.8

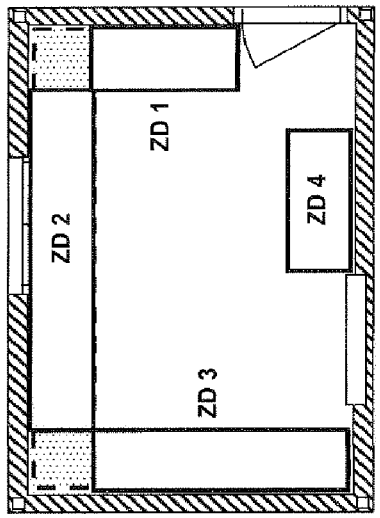
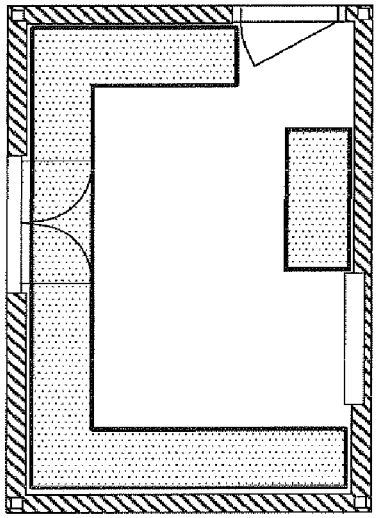
FIG.9
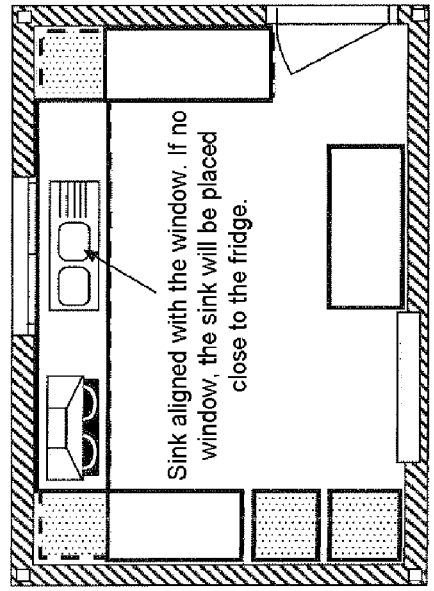
FIG.10

COMPUTER AIDED DESIGN METHOD AND SYSTEM FOR MODULAR LAYOUTS

CROSS-REFERENCE TO PRIOR APPLICATIONS

This application is a Continuation of U.S. patent application Ser. No. 12/748,988, filed Mar. 29, 2010, which claims priority to French Patent Application No. 0901506, filed on Mar. 27, 2009, both of which are hereby incorporated by reference in their entirety.

FIELD OF THE INVENTION

The invention applies to the field of computer-aided design of laid out spaces. More specifically, the invention permits a user of the method and system to lay out a room having a specified use, notably a kitchen, in a defined configuration with pieces of furniture and equipment contained in a catalog.

BACKGROUND OF THE INVENTION

In general, such methods and systems allow either a kitchen distributor salesperson or the final customer of this distributor to visualize the room itself on a computer screen in two or three dimensions with different configurations of the equipment and furniture marketed by the distributor. Therefore, the customer can visualize the elements of the layout matching his choices. Such systems provide a significant aid to achieving a sale as the customer can see the project in a more concrete format. However, prior art systems require the user himself to choose each of the solution elements and to reconstruct a solution right from the start again if the first solution is not entirely satisfactory. This is a long and tedious process which does not allow the customer to quickly visualize a number of options from which he could choose.

BRIEF SUMMARY OF THE INVENTION

The present invention solves this problem by making available a procedure for automatic construction of complete solutions starting from a catalog and then authorizing the construction and preservation of variants which can be compared.

To this effect, the invention discloses a method for generating, by means of a computer at least a solution for positioning in a room a set of elements chosen from a collection of catalogs comprising at least one catalog, said method comprising at least a first room spatial analysis step permitting identification of available volumes, a second step of generating at least one positioning solution by identifying from the collection of catalogs, elements compatible with the identified available volumes resulting from the first step which satisfy a set of predefined selection constraints comprising at least one constraint and a third step for the positioning of at least a part of the identified elements resulting from the second step in a part of the available volumes according to a set of positioning rules comprising at least one rule, wherein said first step of spatial analysis comprises at least a first sub-step for detecting reserved spaces, a second sub-step for calculating free zones and a third sub-step for searching for a set of configurations of free subzones comprising at least one free sub-zone.

Advantageously, each time that at least two solutions exist at the output of the second step, said third positioning step allows the selection of a positioning solution from amongst said at least two positioning solutions exist at the output of the second step, said third positioning step allows the selection of a positioning solution from amongst said at least two positioning solutions.

Advantageously, the room is a kitchen and the set of elements comprises kitchen furniture and equipment.

Advantageously, the first sub-step for detecting reserved spaces is capable of determining at least as reserved space any one of a full height reserved space, an upper reserved space and a lower reserved space.

Advantageously, the second sub-step for calculation the free zones is capable of determining at least as free zone any one of an upper free zone and lower free zone.

Advantageously, the second step comprises at least a first sub-step for selecting a set of layout templates for the room comprising at least one template, said lay out templates being compatible with the available volumes available at the output of the first step.

Advantageously, a layout template comprises at least a layout characteristic chosen from the group comprising a set of layout installation types, a set of elements to install in the room, a set of forbidden elements and a set of element positions in each installation.

Advantageously, a layout template comprises at least two hierarchical levels, of which the highest level is defined as a group of layout templates made up of a collection of elementary templates.

Advantageously, a collection of elementary templates in a group of layout templates is defined by a set of relative positioning rules for the elementary templates in the group of layout templates.

Advantageously, the set of selection constraints comprises at least one constraint of a type chosen from the group of types of constraints comprising the available volumes, the spatial constraints, the availability of elements from the collection of catalogs which comply with the spatial constraints, the user choices and the objectives of the sellers of the elements chosen from the collection of catalogs.

Advantageously, the third step comprises at least a first sub-step for positioning a first subset of elements identified from the output of the second step which have been declared obligatory and a second sub-step for positioning a second subset of elements identified under the constraint of a set of optimization criteria comprising at least one criterion.

Advantageously, the first sub-step for positioning the elements of the first subset comprises at least a process of identifying the straight sections of the room, a process of localizing the elements of said first subset relative to the characteristic points of the room and a process for the addition of the positioning constraints chosen from the group of positioning constraints comprising at least minimum distances between elements declared mandatory, target distances between said elements and positioning constraints with clearance.

Advantageously, the second sub-step for positioning the elements of the second subset comprises at least, for each of the straight sections of the room identified at the output of the process for identifying the straight sections of the room of the first sub-step for the positioning of the elements of the first subset, a process for the formation of groups of candidate elements satisfying at least one constraint function for the filling of the corresponding straight section of the room, and a process for the selection of the best group of candidate elements by application of a particle swarm optimization algorithm.

Advantageously, if the particle swarm optimization algorithm does not produce any solution, the constraint which is violated is indicated to a user of the procedure who is invited to modify at least one choice which led to the violation of at least one constraint.

The invention also disclose a computer system for generating at least one solution for positioning in a room a set of elements chosen from a collection of catalogs comprising at least one catalog, said computer system comprising at least a first room spatial analysis module permitting identification of the available volumes, a second module for generating at least one positioning solution by identifying from the collection of catalogs, elements compatible with the identified available volumes identified at the output of the first module which satisfy a set of predefined selection constraints comprising at least one constraint and a third module for the positioning of at least a part of the identified elements resulting from the second module in part of the available volumes according to a set of positioning rules comprising at least one rule, wherein the first spatial analysis module is able to execute a function for the detection of reserved spaces, a function for the calculation of free zones and a function for searching for a set of configurations of free sub-zones comprising at least one free sub-zone.

Advantageously, each time that at least two solutions exist at the output of the second module, said third module allows the selection of a positioning solution from amongst said at least two positioning solutions.

Advantageously, the inventive system also comprises a module permitting the visualization in three dimensions of at least one positioning solution and a module permitting the generation of two-dimensional assembly drawings for at least one positioning solution.

The main advantage of the invention is that the time to produce a first complete, coherent and valid layout is drastically reduced. Moreover the ergonomics are greatly improved because a tedious "projection" step wherein the solution imagined by the user is portrayed is eliminated. Customization by the user is carried out starting from a complete proposal, which avoids the frustration of having to construct the solution step by step before being able to appreciate the complete solution. This allows the user to use his time to select/evaluate/compare different solutions in relation to his criteria starting from the solution which is proposed to him by the system as a function of the constraints which have been provided and which can be of different types (shape of the room, positioning of openings, utility inlets, product catalogs, safety and ergonomics rules, customer profile and taste, marketing policy of the kitchen designer etc.). Moreover, the method and system permit simultaneous generation of three-dimensional views and two-dimensional assembly drawings.

BRIEF DESCRIPTION OF THE DRAWINGS

The invention will be better understood and its various characteristics and advantages will become apparent from the following description of several exemplary embodiments and their associated figures:

FIG. 4 displays an example of a program integrating the constraints and options in a layout template according to one embodiment of the inventive method;

FIG. 5 displays an example of a program for defining groups of elements belonging to a layout template according to one embodiment of the inventive method;

FIGS. 7A-7B display examples of programs for extracting elements of a layout template from a catalog according to one embodiment of the inventive method;

FIG. 8 is an example of a program which applies a filter to the catalog elements according to one embodiment of the inventive method;

FIG. 9 represents an example of the identification of straight zones for carrying out the positioning of obligatory elements according to one embodiment of the inventive method;

FIG. 10 represents an example of the positioning of mandatory elements in the straight zones identified according to one embodiment of the inventive method;

DETAILED DESCRIPTION

Figure 1:
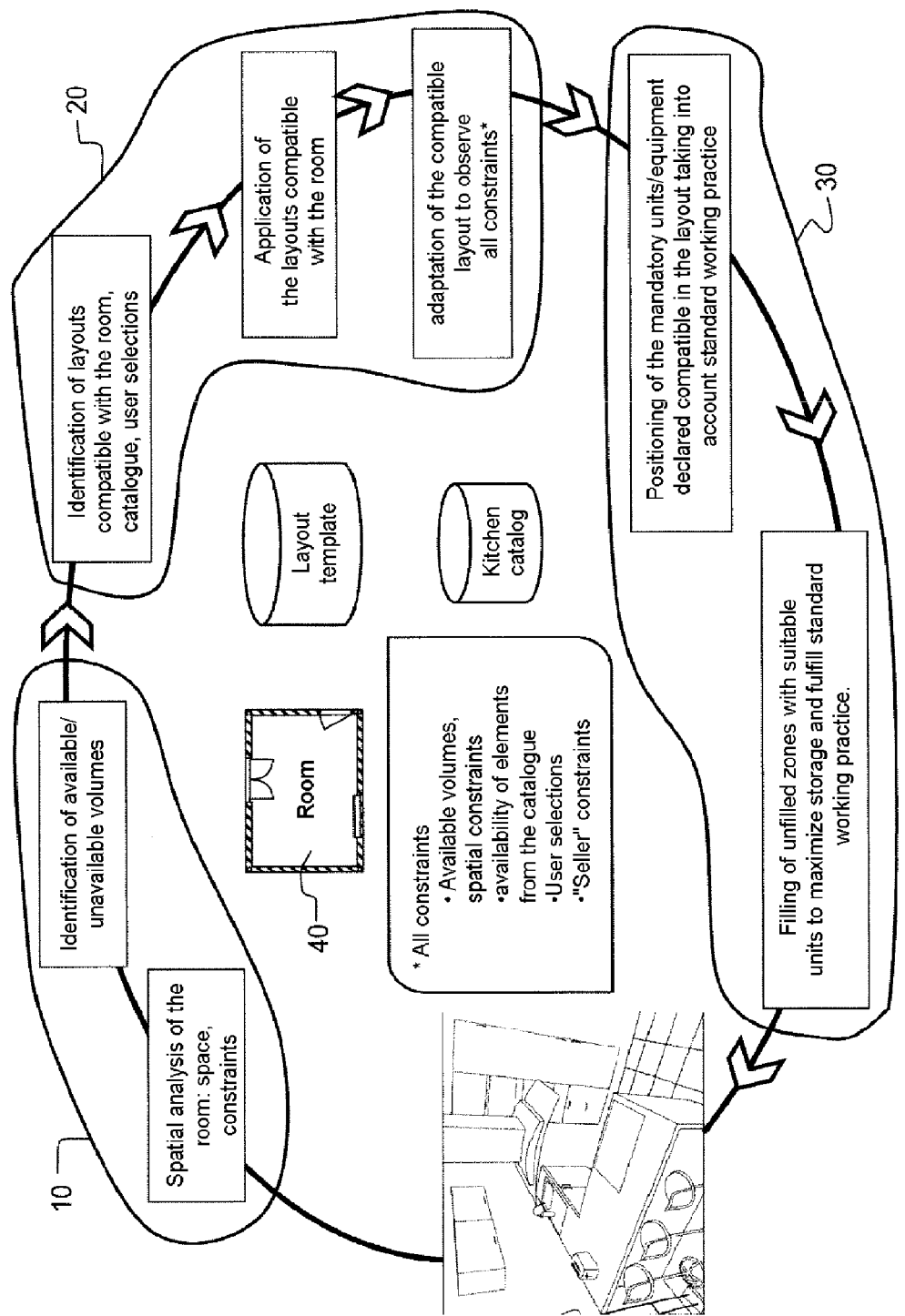
FIG. 1 displays the main steps of the inventive method according to one embodiment of the inventive method.

FIG. 1 displays the main steps of the procedure according to one embodiment of the inventive method. In a generic room layout method according to the invention, in which said room is filled with furniture elements, three steps must allow the finding of the most satisfactory result for both the customer and the seller.

First of all the volumes available in the room must be identified so that the furniture elements can be placed in them. This is the purpose of a first step 10 of the inventive method which carries out a spatial analysis of the room to be planned with the aim of identifying the room volumes which are available and not available. The next step is to determine the available layouts which can be placed in the available volume of the room. This is the purpose of the second step 20 of the inventive procedure. The possible layouts are filtered, notably depending on the available volume and the spatial constraints (presence of windows or radiators . . . ), on the physical availability of the selected elements from the catalog of a given supplier on a given date, on the preferences of the users and the sellers' sales objectives. The first filter determines the list of candidate elements taking into account the spatial, horizontal and vertical constraints of the room determined as the output of step 1. The second filter investigates the availability of furniture elements in the catalog(s) of suppliers approved for this application. The third filter selects, depending on the user preferences, what is defined as a "layout template", a concept which will be further developed in the comments about FIG. 3. The fourth filter takes into account the sales objectives of the seller. Indeed, it is by necessity in the interest of the seller to promote one or an other product line depending on past destocking, gross margins per element, available stock on the date of querying. These elements can be parameterized in the layout template. Finally, the positioning of the filtered layout elements at the output of step two is carried out according to a third step 30 of the procedure which comprises two sub-steps, the first dedicated to mandatory elements, for example in the case of a kitchen, cooking and preservation elements, which must by necessity form part of the elements belonging to the configuration selected for the room, the second being dedicated to non-mandatory elements where the goal is to optimize the space occupied relative to a storage objective.

FIG. 2 displays the spatial analysis of the room according to one embodiment of the inventive method. One room 40 visible in FIG. 2A notably comprises constraints 50 in the form of windows 510, door 520 or radiator 530. The room and its constraints are displayed with their characteristic dimensions in plan view and height-wise.

The room spatial analysis step 100 comprises a first sub-step for the detection of the reserved spaces 110 (displayed on FIG. 2B) which starts with a detection of the default fill paths, along the room walls. Next, constraints 510, 520, 530 determine the reserved spaces. These are of three types: RET or full-height reserved space; REH or upper reserved space; REB or lower reserved space. The first type of reservation is necessary for the doors, no furniture element can be allocated over the full height of the door. The second reservation type is adapted to windows: normally, low elements can be placed beneath the windows, while nothing can be placed above the bottom edge of the window. By contrast, the third type of reservation is adapted, for example, to radiators: normally, high elements can be placed above radiators, while nothing can be placed below the top edge of the radiator.

Figure 2A:
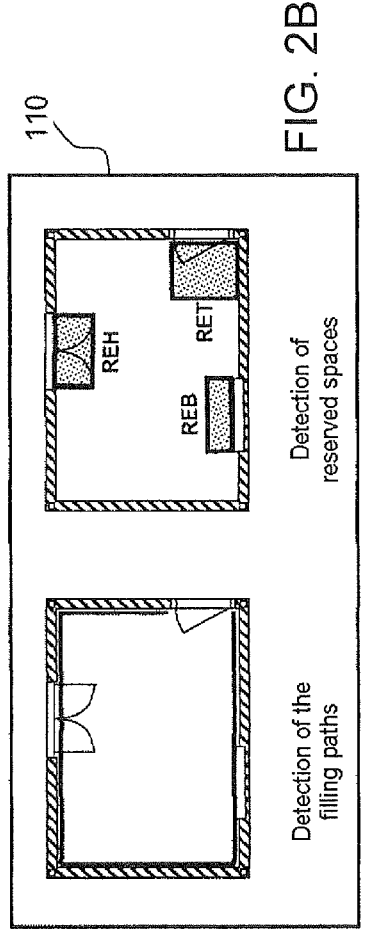
FIGS. 2A-2D display the spatial analysis of the room according to one embodiment of the inventive method.
Figure 2B:
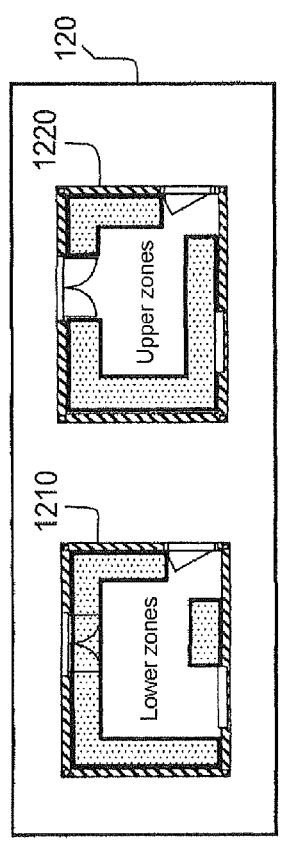
Figure 2C:
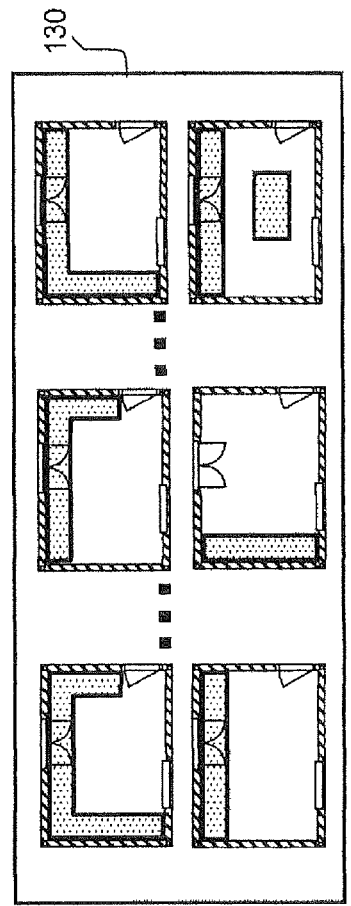

The second sub-step 120 of the room spatial analysis step, illustrated in FIG. 2C, comprises the determination of free zones suitable for receiving the layout elements. The depth of a free zone is set at a default parameter (for example 60 cm for a low part (base unit) and 30 cm for a high part (wall unit)). This parameter may be adjusted as a function of the choice of the catalog. On the two views 1210 and 1220, one can visualize the lower zones (possibly forming the subject of an upper reserved space, REH) and the upper zones (possibly forming the subject of a lower reserved space, REB). The height parameters of the lower and higher elements are respectively defined as 100 cm from the ground for the high point of the lower elements and 120 cm from the ground for the lower point of the upper elements, the latter possibly extending up to the ceiling or just up to the higher point of an adjoining wall cabinet. Upon final assembly, these parameters are modified to take into account the elements available from the catalog and the installation constraints. The lower zones have height reservations, notably to prevent the positioning of a cabinet in an incorrect location.

Figure 2D:
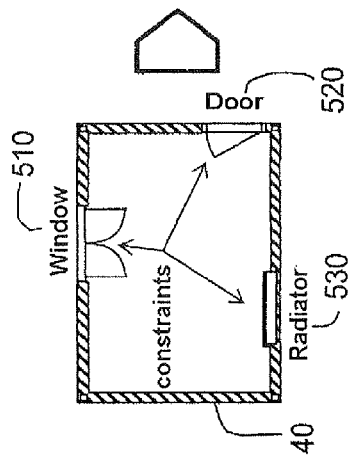

The third sub-step 130 of the room spatial analysis step, involves decomposition of the free zones into free sub-zones which can then be associated with layout templates or a set of layout elements. The free sub-zones are defined by testing the typical configurations in I, II, L, U as defined later in the description, the main constraint for these configurations being that the elements must be attached to a wall and island configurations, which can be central, offset to the right or to the left. In an island configuration, the main constraint is that people must be able to move around with sufficient clearance along the longest sides of the island. These sets of sub-zones, once constructed, can be modified (increased in size, reduced, withdrawn, cut into discontinuous subsets . . . ), as illustrated in FIG. 2D.

FIG. 3 to FIG. 8 illustrate and provide computer code comments for the parts of the inventive method the purpose of which is to identify the elements which can be used in the room layout (step 20).

Figure 3:
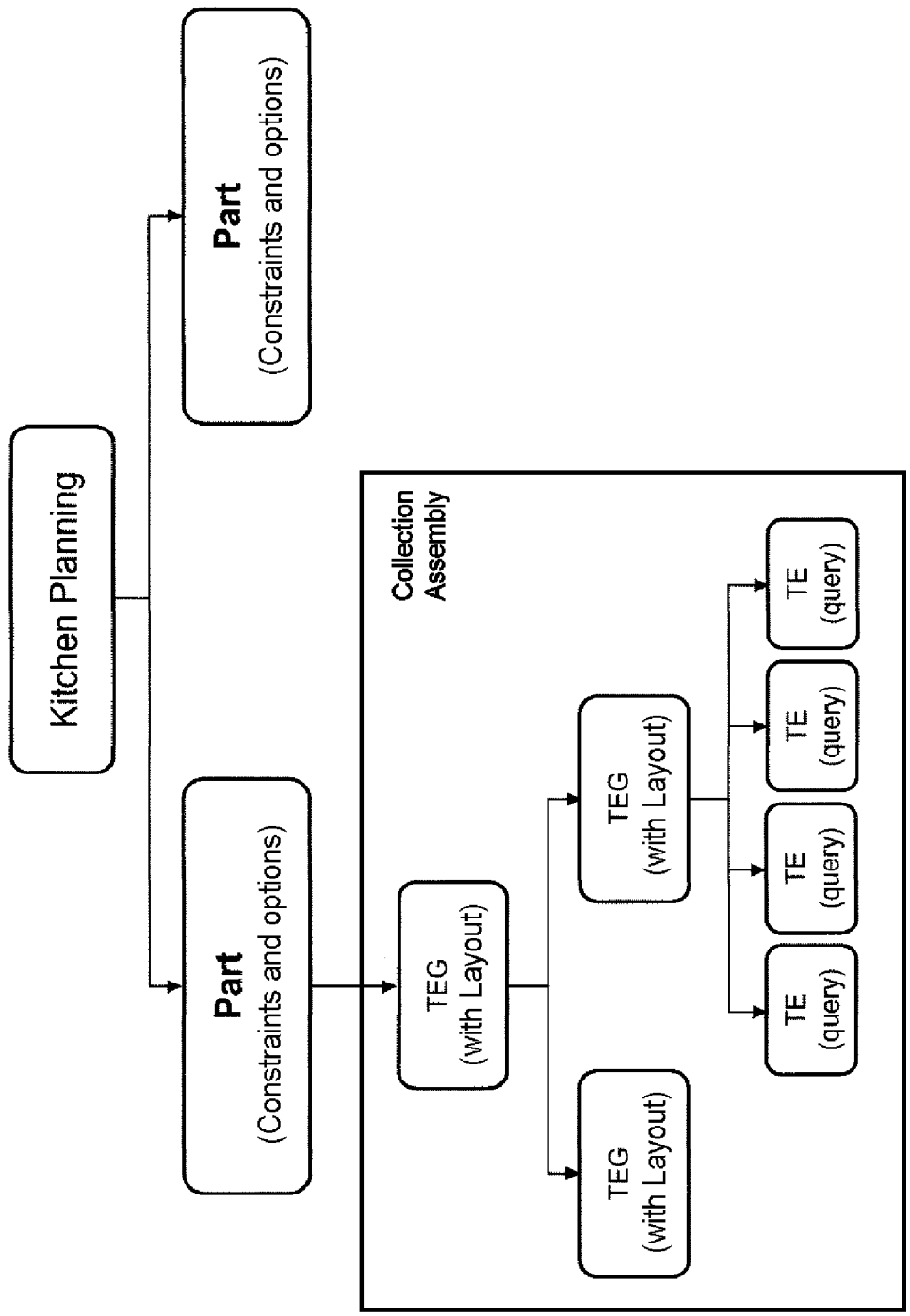
FIG. 3 displays the logical structure of a layout template according to one embodiment of the inventive method.

FIG. 3 displays the logical structure of a layout template according to one embodiment of the inventive method.

Using the concept of a layout template, more specific elements are defined corresponding to the type of room to be planned and the elements which will be used to implement this layout. A layout template is the set of elements which distinguish one laid out room from another. For example, in the case where the room to be planned is a kitchen, the layout template may define:

The kitchen installation, for example in the form of a U, L, I, II, with or without an island in the middle of the room, with or without integrated dining space, etc. . . . ;

In a U-shaped kitchen, the layout has a U-shape occupying three walls; this arrangement permits maximum and functional use of the space in a well-dimensioned, essentially square, kitchen (20 to 25 $m^2$). In an L-shaped kitchen, the layout is applied to two walls at an angle; this is the most classical design for medium-sized rooms (10 to 15 $m^2$); the kitchen is often equipped with a kitchen table in the centre of the room. In an I-shaped kitchen, the layout is installed on a single wall; this is the only solution for corridor-shaped rooms of limited width (long narrow room). In a double I kitchen (II), the units are positioned on two parallel walls; this layout is typical in wide-corridor rooms (2.4 m minimum); it permits optimization of storage and movement of persons).

The elements making up the kitchen (unit types–upper, lower storage, or full-height storage; unit+equipment set (sink unit, cooktop unit . . . ); work surface . . . );

The elements which are not to be proposed that are specified by the planner, notably depending on the coherence rules for the style of each of the typical kitchen categories which he wishes to offer to his customers;

The position of elements in the layout.

All the elements defining a template may or may not be mandatory. The definition of a layout template is made independently of the kitchen catalogs which are involved at a later stage of the process, as well as the choice of a kitchen style (the same catalog offers several styles).

FIG. 3 displays a hierarchical structure of the layout templates. A "Template Element Group" (TEG) consists of a set of layout elements which fulfill a list of constraints and are characterized by a list of options. These TEGs associated with a spatial layout consist of Template Elements (TE) which are the lowest hierarchical element in a kitchen designer's parts list (elementary object). The assembly is carried out in an "agnostic" manner. An agnostic assembly is an assembly of catalog elements made without knowing either the catalog or the catalog element. The final elements of the assembly (TE) are therefore still not known (resolved) since the catalog to be used is still not known. Until an assembly is not associated with a catalog, it cannot exist. This allows to describe, for example, an assembly made up of furniture units which can include an oven, a cooktop and a hood independently of the catalogs used. This procedure likewise permits easier management of the changes to or the replacement of a catalog.

FIG. 4 displays an example of a program for taking into account the constraints and options in a layout template according to an embodiment of the inventive method. Each of the room zones to be planned is subject to processing, on the one hand in terms of constraints, on the other hand in terms of options. The layout model which is the subject of the programs of FIG. 4 is compatible with U, L, I and II-shaped kitchens. It defines lower and upper units and the wall sections to be used. The examples of constraints expressed by the program are shown opposite to the corresponding lines of program codes. The constraints may be of a mandatory type to hide a zone using furniture units; minimum and maximum zone lengths to be laid out; relative position of sub-assemblies. The positions of the sub-assemblies are defined in each zone. Each zone has an associated curvilinear path with a start and a finish. The position of the object is the curvilinear abscissa along this path. It should be noted that this path is not necessarily linear.

The options may for example define the existence or absence of a rear panel on the furniture units; the existence or absence of support on the sides of the units (a support on the side of the unit is a vertical panel less thick than the walls of the unit—in general of the same color as the face, positioned on the ends for aesthetic reasons—for example to hide a white enclosure or to improve the finish); the existence or absence of a Jamb (thick vertical panel—in general of the same material as the work surface—positioned at the ends either to support the work surface in certain cases—dishwasher at one end which does not support the work surface—or for aesthetic reasons); the existence or absence of an overhang at the sides and possibly at the rear of a work surface, etc. . . .

FIG. 5 displays an example of a program for defining groups of elements belonging to a layout template (TEG) according to an embodiment of the inventive method.

A TEG is made up of an assembly of elements which may themselves be assemblies of elements. The "child" elements may be positioned at the heart of the upper level assembly by means of a layout or positioning associated with the said upper level. Different positioning types are possible. Solely by way of an example are:

LayoutModularStorage positions the required elements while adhering to kitchen designer best practice which will be explained in more detail in the description following below; this function can likewise be used to fill in the free zones;

LayoutElectricalGoods positions equipment in the furniture units;

LayoutTallUnitWithCasing positions a cabinet-type furniture unit while adding a partition;

. . .

At the elementary or end level (at the bottom of the TEG hierarchical tree), the positioning program is defined by a query which specifies the characteristics which will be searched for in a later stage of the procedure in the collection of the catalogs of elements. Constraints can be associated with each element, for example:

a constraint of "snap" type for attaching an element to its left-hand neighbor (SnapToNext) or right-hand (SnapToPrevious); which is possible because the elements are positioned on a curvilinear path; the "snap" constraint equally allows forcing of the position of an element to the end (SnapToEnd) or the start (SnapToStart); a SnapToStart constraint combined with SnapToNext or SnapToPrevious constraints permits, for example, the placing of several elements at the start, notably to position cabinets at the start or end of a zone);

zone in which the element must be inserted;

absolute or relative position; as indicated above, the absolute position is the curvilinear abscissa along the zone path; in an assembly, the relative position is the position of a sub-element relative to its parent element.

Figure 6:
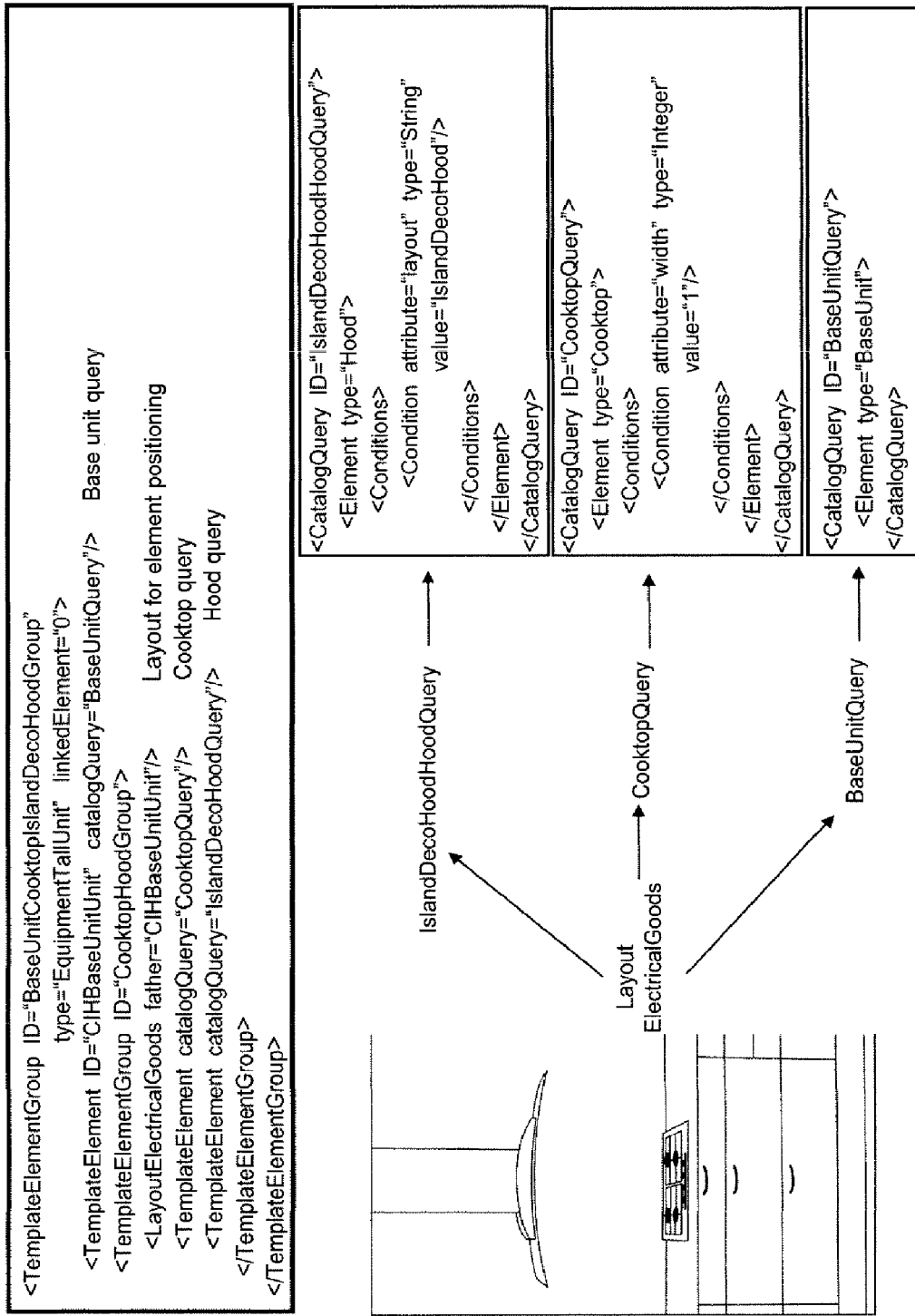
FIG. 6 displays examples of programs permitting the use of groups of elements belonging to a layout template as elements of a sub-assembly according to one embodiment of the inventive method.

FIG. 6 displays examples of programs allowing the use of groups of elements which belong to a layout template as elements of a sub-assembly according to embodiment of the inventive method. In the example illustrated in this figure, a TEG of type LayoutElectricalGoods defines the assembly of a base furniture unit (BaseUnit), of a cooktop (CookTop) and a hood (IslandDecoHoodHood). These three elementary templates are defined by queries.

FIG. 7 displays examples of programs for extracting elements of a layout template from a catalog according to embodiment of the inventive method.

A TEG is an assembly of TEs. Each TE is defined by a query or elementary query, which only takes into account the criteria necessary for the launching of a search within a collection of catalogs. The query can be enhanced notably to take into account:

customer preferences (double sink; integrated hood or decorative hood, etc. . . . ); see FIG. 7A kitchen designer best practice (which will be explained in more detail in the description following below);

dimensional constraints (for example for a base unit which is to hold a sink, it must be possible for the base unit to contain the sink . . . ); see FIG. 7B

. . .

If a TE of a given type is mandatory in a TEG, it will not be possible to subsequently alter the corresponding query. For example, if the TE must be a double sink, the customer cannot choose a single sink . . . .

FIG. 8 is an example of a program which applies a filter to the catalog elements according to an embodiment of the inventive method. In the query example displayed on this figure, the element type is a wall unit. The element must satisfy the conditions (here notably, it must have a glass door). A filter can be added. In the example, the applied filter ensures that the query transfers the smallest of the elements: the query is carried out in 3 stages: i) a first request is executed which finds several elements in the catalog; ii) sorting is carried out based on the filter parameter (in the example, height); iii) the smallest element is selected . . . .

FIG. 9 to FIG. 12 illustrate and provide computer code comments for the parts of the inventive method the purpose of which is to position elements in the room layout.

Certain elements are defined as mandatory in the layout template. Likewise the elements concerned may, without being functionally mandatory, form part of a range that the distributor wishes to promote (for example, saucepan storage units) or elements that the customer wants to add (for example 5-drawer base units).

The positioning of these mandatory elements notably takes into account:

Optional positioning described in the layout template;

Kitchen designer best practice; the main rules of the art of the skilled kitchen designer are:

Minimization of displacements for the preparation of meals between the three vertices of the triangle of activity comprising the cold vertex (fridge, freezer, . . . ), the washing vertex (sink, dishwasher, . . . ) and the cooking vertex (cooktop, oven, microwave . . . );

Minimum distances to be observed between certain elements (refrigeration and cooking for example);

Positioning of certain elements in respect of the water inlets and outlets;

Positioning at height of certain elements (oven, to prevent access by young children);

Reservation of work spaces on each side of the sink and the cooktop;

Reservation of storage spaces alongside the work spaces;

Optimization of lighting (placing of work spaces beneath a window and lighting of said spaces . . . );

Positioning of certain elements imposed by the customer. Each element is positioned in a straight zone. A straight zone is a part of the layout which is linear.

FIG. 9 represents an example of the identification of straight zones for carrying out the positioning of mandatory elements according an embodiment of the inventive method.

In the example displayed on this figure, 4 straight zones are identified: in the counterclockwise direction, these 4 zones are labeled ZD1 to ZD4.

FIG. 10 represents an example of the positioning of mandatory elements in the straight zones identified according to embodiment of the inventive method. If ZD2 comprises a window, the sink is placed beneath the window (if the positioning is adequate, taking into account the positions of the water inlets and outlets). If ZD2 does not comprise a window, the sink will be placed close to the fridge (if the positioning is adequate, taking into account the positions of the water inlets and outlets). The order in which the constraints are applied is arbitrary (in this precise case, the water point is given priority over the window). Nevertheless, this order is not fixed: it can be modified depending on the rules set by the kitchen designer. Moreover, these constraints could be "lifted" in free mode where it is possible to reposition units in another location (in this instance the sink unit).

Figure 11:
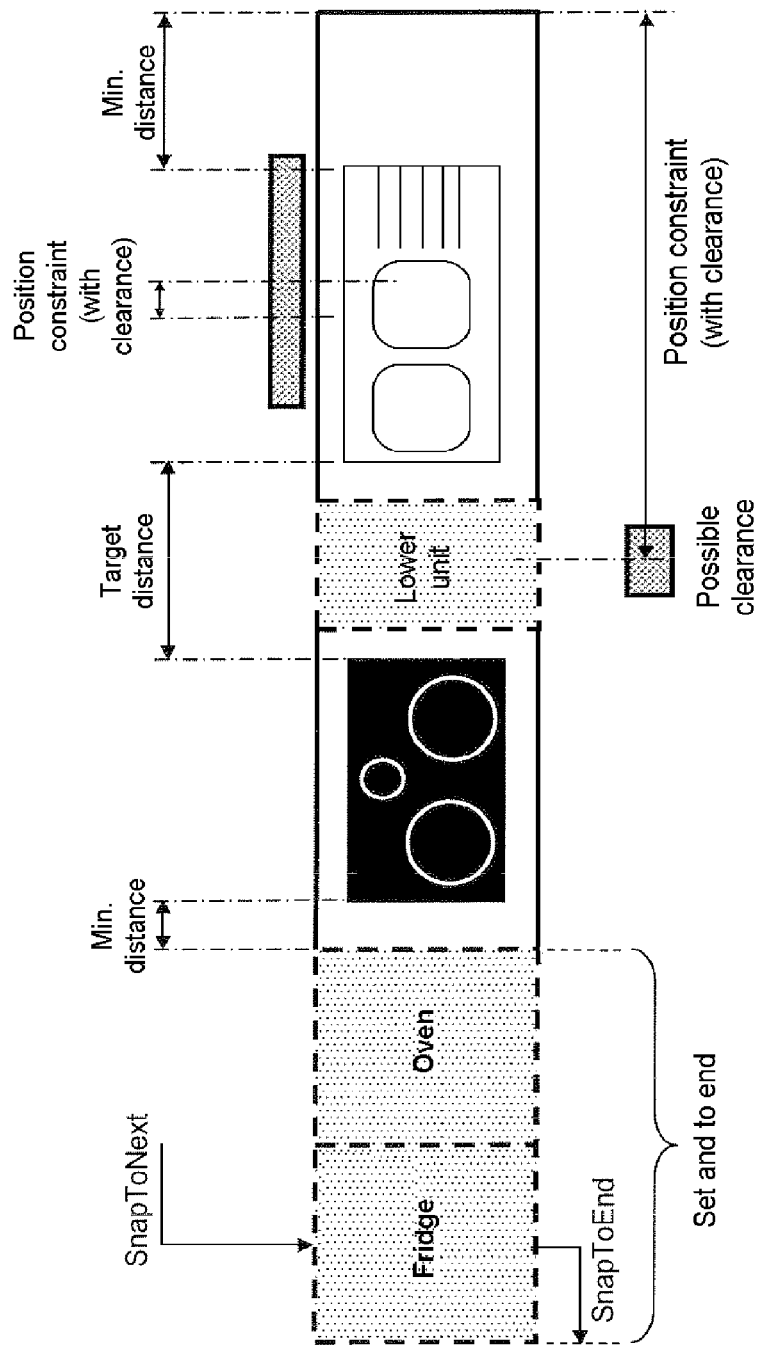
FIG. 11 represents an example of the addition of constraints in the step for the positioning of mandatory elements.

FIG. 11 represents an example of the addition of constraints in the step for the positioning of the obligatory elements. In this example, the constraints taken into account are:
  A constraint for the minimum distance between the cooktop and the oven and a constraint for the minimum distance between the sink and the straight wall;
  A target distance constraint between the cooktop and the sink to ensure at the same time correct positioning of a base unit and a target width for the work surface;
  A target position constraint for the sink with clearance relative to the wall.

The "Set to end" constraints which appear in the figure are the SnapToEnd and SnapToNext constraints already explained which are used to build up the assemblies (here comprising a fridge for one and an oven for the other) at one end of the zone.

Figure 12:
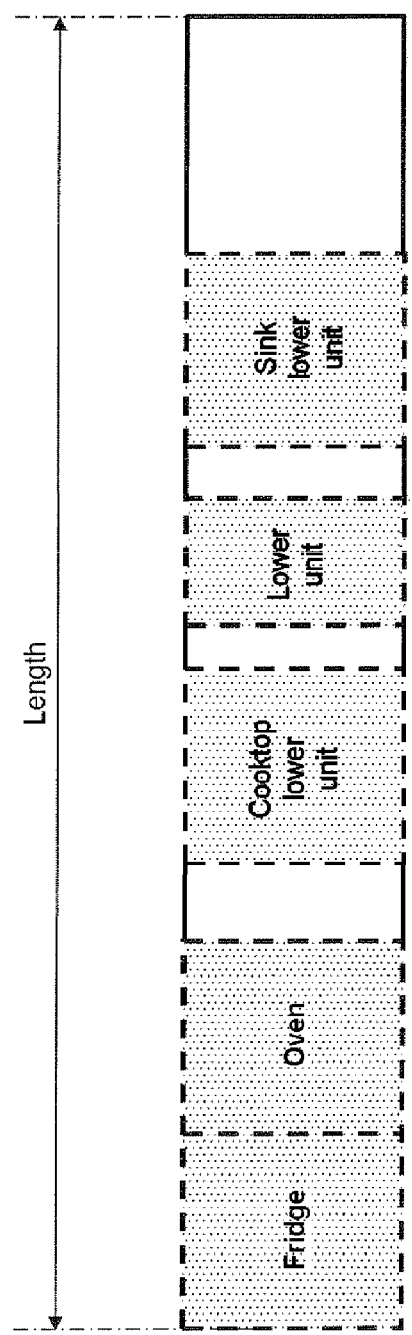
FIG. 12 illustrates an example of the filling in of zones with elements according to one embodiment of the inventive method.

FIG. 12 illustrates an example of the filling in of zones with elements according to embodiment of the inventive method. The filling in by the non-mandatory furniture elements is carried out for each straight zone. A list of candidate furniture units is drawn up. Normally this list depends on the layout template, customer choices (for example, selection of glass-fronted units, . . . ) of the zone type (lower (base) or upper (wall)), but likewise, possibly on the type of furniture units that the distributor wishes to promote. Once the list has been drawn up, after having tested their availability on the date required by the customer, the list of dimensions for the available units is derived (for example, 300, 600, 800, 1200 mm . . . ). Therefore, the problem to be solved is a discrete, single-dimension problem, that of the dimension of the straight zone to be populated. To resolve this problem, the following functions are defined:
  The total length of the elements, Target Length (TL);
  By setting,
    Length, total length of the straight zone to populate;
    $leo_i$, length of each obligatory element i,
    $l_i$, length of each element i, $$TL = \text{Length} - \sum_i^{N_{eo}} leo_i - \min(largeurfileur)$$

A function, F to minimize:

$$F = \left(TL - \sum_i^N l_i\right)^2 + \sum_i^P w_i * f^2(cst_i)$$

With the following additional definitions:
  $w_i$ weighting associated with each constraint: each constraint does not have the same weighting in the resolution
  $cst_i$: a constraint
  f: function associated with each constraint: the function depends on the constraint In the event that the problem does not comprise any constraint, F is simplified by the omission of the 2nd term of the equation.

In the event that there are constraints, the functions $f(cst_i)$ and the weightings $w_i$ are determined in the following manner:
  Min. distance (inviolable) between a wall and an element
    0 if the constraint is not violated, if not
    (Position of the wall−(position of element−width of element*0.5))*Penalty
  Min. distance (inviolable) between an element and a wall
    0 if the constraint is not violated, if not
    (Position of element+width of element*0.5−position of the wall)*Penalty
  Min. distance (inviolable) between an element i and an element j
    0 if the constraint is not violated, if not
    (position of element(i)+width of the element(i)*0.5−(position of element(j)−width of element(j)*0.5)*)Penalty
  Target distance between two elements
    If position of element(i)<position of element(j):
    position of element(i)+width of element(i)*0.5−(position of element(j)−width of element(j)*0.5)
  Position constraint:
    Element position−target position
    A position constraint can have a clearance zone. If the element position is outside the clearance zone the following term will be added: (zd=clearance zone) (Abs(element position−target position)−zd*0.5)*Penalty The "snap" constraints are managed either before or after the solver.

The weightings are determined by calibration so as to provide acceptable solutions. Notably, the inviolable constraints are allocated the heaviest weightings, position constraints are allocated a medium weighting and target distance constraints are allocated a low weighting.

Once the constraint functions are determined, together with their weightings, a set of ordered dimensions must be found which minimize F. The number of dimensions responding to the problem is one of the unknowns to be determined in the solution.

The solution(s) searched for are those which minimize F. A solution is an ordered list of dimensions for which the sum of the dimensions is less than or equal to TargetLength. Before carrying out the optimization, the solution space is calculated. If there is at least one solution and if the estimated calculation time is not too long, a direct resolution method is possible: F is calculated for all the candidate solutions. If the estimated calculation time for all of the optimizations of a same layout exceeds 2 seconds, a solution algorithm of the Particle Swarm Optimization type is, for example, used for the most expensive optimizations in terms of computation time.

Optimization using particle swarm (particle swarm method), as is known from the existing art, is an optimization metaheuristic. This optimization method is based on the collaboration of individuals amongst themselves. It applies to the concept of self-organization. This idea means that a group of individuals of limited intelligence can possess a complex overall organization.

Thus, thanks to very simple displacement rules (in the solution space), the particles can converge progressively towards a local minimum. When initializing the algorithm, each particle is therefore positioned (randomly or not) in the search space of the problem. Each iteration causes the particles to move depending on 3 components:

Its current speed,

Its best solution $P_i$,

The best solution obtained in its neighborhood $P_g$.

It may be that no solution is found. This may occur for two reasons.

The first reason is that the length found is too far from the TargetLength. In this case, the catalog is searched for one or more elements of smaller length which are not contained in the list of available lengths. (Example: in the list of available lengths the smallest length is 300 and the catalog contains an element of length 150). A second optimization is launched by adding this element. If the second optimization does not provide a solution, the user is informed.

The second reason is that at least one "inviolable" constraint is violated. In this case, those elements with which the violated constraints are associated are identified and the user is precisely Informed about the element which causes the absence of a solution, which allows the user to modify his choice accordingly.

The best solutions output from the algorithm are stored in such a way that they can be presented to the customer. The number of solutions presented to the customer can be parameterized.

Programs for the implementation of the different steps of the inventive procedure are comprised of subroutine libraries preferably written in the language C++ which are called by the various procedures of which examples have been given in the description (spatial analysis procedures for the room and identification of the available/unavailable volumes, procedures for identifying the straight zones, procedures for defining layout templates (TEG, TE), query procedures for the catalog collection, procedures for positioning and optimization etc.).

A system to implement the various steps of the invention comprises hardware and software modules. The software modules comprise the above procedures and routines, organized so as to optimize the development, maintenance and data access times, and the execution and visualization performance. The hardware modules comprise a server with the necessary peripherals for data storage (catalog collection parameters belonging to each of the distributors, data for each customer and history of his connections, etc.). The server is connected to a private or public network using a protocol of the http or https type. It is normally operated by an application supplier. Workstations can be installed at the distributor's premises or be made up of individual customer PCs directly connected via the Internet to the server. Advantageously, the workstations allow the system users to visualize the results of the simulations in three dimensions. Likewise, they advantageously permit printing of assembly drawings for the solution selected by the customer. It is possible to supply said assembly drawings to the distributor with a purchase order after the client has paid a first installment.

The examples given above are solely for illustrating some of the embodiments of the invention. These examples relate to kitchen layouts. With certain adaptations, they could easily be extended to the layout of other types of rooms. The inventive system and method apply as is for the layout of walk-in closets (rooms for storing clothes) or bathrooms; all that is required is to substitute the working practice of the walk-in closet or bathroom designer for that of the kitchen designer. In a more general way, this methodology can apply to the layout of rooms containing storage zones using a furniture catalog, in a domestic dwelling or an office space, e.g. in medical laboratories, home workshops, etc. By way of adaptations, the invention could likewise be applied to shop layouts (identification of the shelving).

Therefore the implementation examples are in no way limiting the scope of the invention which is defined by the appended claims.

The invention claimed is:

1. A method for generating, by means of a computer, at least a solution for positioning in a room a set of household elements chosen from a collection of catalogs comprising at least one catalog, said method comprising:

at least a first computer-implemented room spatial analysis step of automatically identifying first volumes available for automatically positioning said household elements, a second computer-implemented step of automatically generating at least one positioning solution by identifying from the collection of catalogs household elements compatible with the identified first volumes which satisfy a set of computer-generated predetermined selection positioning constraints comprising at least one constraint chosen from a group of types of constraints comprising the first volumes, spatial constraints, availability of household elements chosen from the collection of catalogs which comply with the spatial constraints, user choices and objectives of sellers of the household elements chosen from the collection of catalogs, and a third step for the automatic positioning of at least a part of the identified household elements resulting from the second step in at least a part of the first volumes according to a set of positioning rules comprising at least one rule, wherein said first step comprises at least a first sub-step for automatically detecting second volumes unavailable for positioning any household element, a second sub-step for calculating volumes available for positioning said household elements and a third sub-step for searching for a set of configurations of available sub-volumes comprising at least one available sub-volume.

2. The method of claim 1, wherein, each time that at least two positioning solutions exist as the output of the second step, said third positioning step allows the visualization by a user of said at least two positioning solutions and the selection by said user of a positioning solution from amongst said at least two positioning solutions.

3. The method of claim 1, wherein the room is a kitchen and the set of household elements comprise kitchen furniture and equipment.

4. The method of claim 1, wherein the first sub-step for detecting second volumes unavailable for positioning any household element comprises finding any one or more of a full height volume, an upper unavailable volume and a lower unavailable volume.

5. The method of claim 1 wherein the second sub-step for calculating the volumes available for positioning said household elements comprises determining at least any one or more of an upper available volume and a lower available volume.

6. The method of claim 1, wherein the second step comprises at least a first sub-step for selecting a set of layout templates for the room comprising at least one template, said layout templates being compatible with the first volumes.

7. The method of claim 6, wherein a layout template comprises at least a layout characteristic chosen from the group consisting of a set of layout installation types, a set of household elements to install in the room, a set of forbidden household elements and a set of household element positions in each installation.

8. The method of claim 6, wherein a layout template comprises at least two hierarchical levels, of which the highest level is defined as a group of layout templates made up of a collection of elementary templates.

9. The method of claim 8, wherein a collection of elementary templates in a group of layout templates is defined by a set of relative positioning rules for the elementary templates in the group of layout templates.

10. The method of claim 1, wherein the third step comprises at least a first sub-step for positioning a first subset of household elements identified from the output of the second step which have been declared obligatory and a second sub-step for positioning a second subset of household elements identified under a constraint of a set of optimization criteria comprising at least one criterion.

11. The method of claim 10, wherein the first sub-step for positioning the household elements of the first subset comprises at least a process of identifying straight sections of the room, a process of localizing the household elements of said first subset relative to characteristic points of the room and a process for addition of the positioning constraints chosen from a group comprising at least minimum distances between household elements declared mandatory, target distances between said household elements and positioning constraints with a clearance.

* * * * *